US008028393B2

(12) United States Patent
Björni et al.

(10) Patent No.: US 8,028,393 B2
(45) Date of Patent: Oct. 4, 2011

(54) ELEVATOR ARRANGEMENT

(75) Inventors: Osmo Björni, Hyvinkaa (FI); Niko Korkeakangas, Loimaa (FI)

(73) Assignee: Kone Corporation, Helsinki (FI)

(*) Notice: Subject to any disclaimer, the term of this patent is extended or adjusted under 35 U.S.C. 154(b) by 336 days.

(21) Appl. No.: 12/267,381

(22) Filed: Nov. 7, 2008

(65) Prior Publication Data

US 2009/0114487 A1 May 7, 2009

Related U.S. Application Data

(63) Continuation of application No. PCT/FI2007/000109, filed on Apr. 26, 2007.

(30) Foreign Application Priority Data

May 8, 2006 (FI) ..................................... 20060441

(51) Int. Cl.
*B23Q 3/00* (2006.01)
*B66B 7/10* (2006.01)

(52) U.S. Cl. ......................................... 29/464; 187/412

(58) Field of Classification Search .................... 29/464, 29/428, 402.08, 402.01; 187/412
See application file for complete search history.

(56) References Cited

FOREIGN PATENT DOCUMENTS

JP 2001-114484 A 4/2001

*Primary Examiner* — John C Hong
(74) *Attorney, Agent, or Firm* — Birch, Stewart, Kolasch & Birch, LLP

(57) ABSTRACT

A method for installing the hoisting roping of an includes at least an elevator car provided with safety gear, the elevator car moving in essentially a vertical direction along guide rails in the elevator shaft, a hoisting machine, a traction sheave, and at least a plurality of diverting pulleys as well as hoisting roping and a rope compensation appliance. In the installation phase the hoisting ropes are lifted into the elevator shaft by means of an auxiliary hoist by moving the elevator car situated in the shaft with the auxiliary hoist, in connection with which elevator car the ends of the hoisting ropes are fixed.

10 Claims, 4 Drawing Sheets

ELEVATOR ARRANGEMENT

Figure 1:
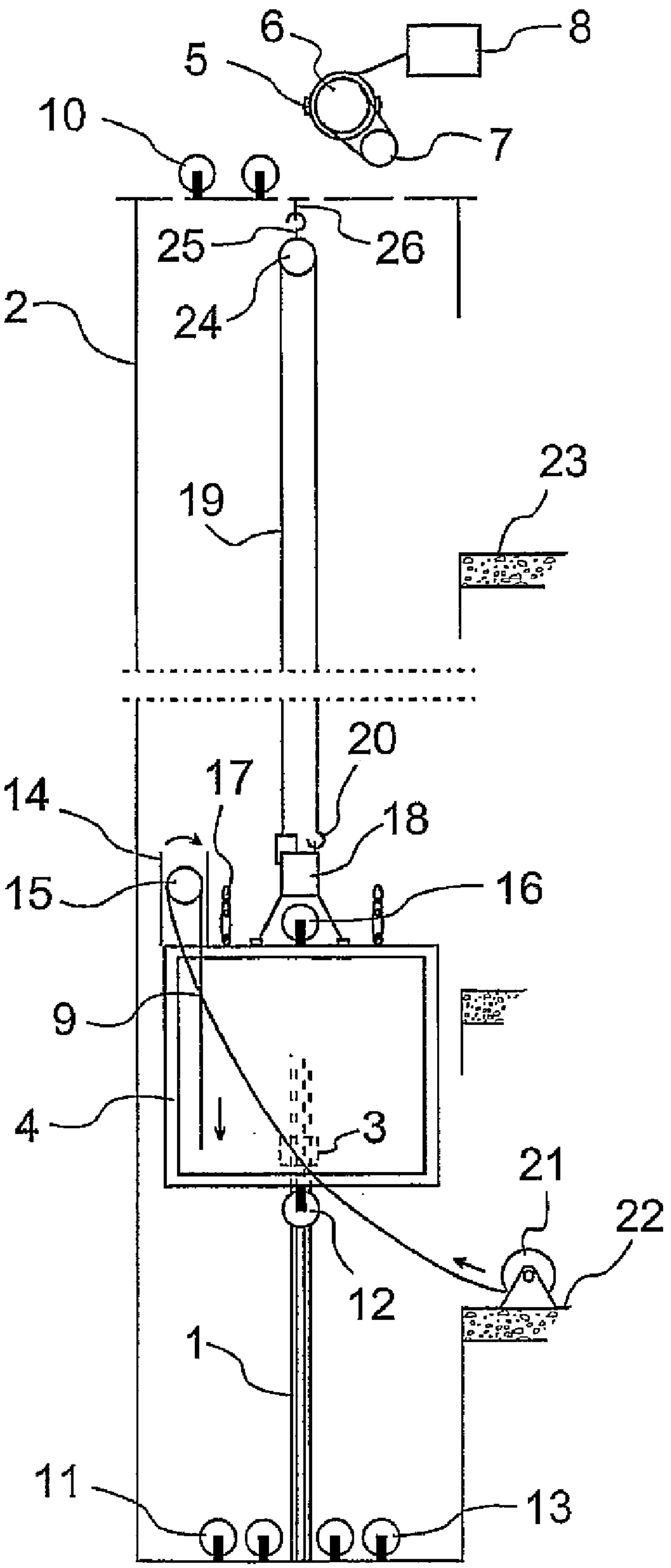

This application is a Continuation of copending PCT International Application No. PCT/FI2007/000109 filed on Apr. 26, 2007, which designated the United States, and on which priority is claimed under 35 U.S.C. §120. This application also claims priority under 35 U.S.C. §119(a) on Patent Application No(s). 20060441 filed in Finland on May 8, 2006. The entire contents of each of the above documents is hereby incorporated by reference.

The present invention relates to a method for installing the hoisting roping of an elevator as disclosed in the preamble of claim 1.

The invention is especially directed at the installation of the hoisting roping of an elevator without counterweight provided with a plurality of diverting pulleys. Because these types of elevators are rare, there is no established method for installing the hoisting ropes. Therefore the hoisting ropes are installed in the manner regarded each time as best. The hoisting ropes are installed e.g. by dropping the hoisting ropes from the machine room into the elevator shaft onto the elevator car situated in the upper part of the elevator shaft and by placing the hoisting ropes onto the rope pulleys situated above the car and by guiding the ropes past the elevator car to the rope pulleys situated below the car. Many special tools and different auxiliary tools must be used to enable the installation work. A problem in these solutions is also that in high-rise buildings the long hoisting ropes required are heavy, in which case the installation work is very hard and owing to the difficult working conditions and working positions the risk of accidents is great. In addition the installation work with conventional methods is extremely slow.

The purpose of this invention is to eliminate the aforementioned drawbacks and to achieve an easy and quick as well as ergonomic and safe method for installing the hoisting roping of an elevator. Another purpose of the invention is to achieve a method that is suitable for use in many different types of elevators with counterweight. Likewise the purpose of the invention is to achieve a method that is suited for use in both elevators with machine room and elevators without machine room. The method of the invention is characterized by what is disclosed in the characterization part of claim 1. Other embodiments of the invention are characterized by what is disclosed in the other claims.

Some inventive embodiments are also discussed in the descriptive section of the present application. The inventive content of the application can also be defined differently than in the claims presented below. The inventive content may also consist of several separate inventions, especially if the invention is considered in the light of expressions or implicit subtasks or from the point of view of advantages or categories of advantages achieved. In this case, some of the attributes contained in the claims below may be superfluous from the point of view of separate inventive concepts. Correspondingly, each of the different details presented in connection with the embodiment of the invention can also be used in other embodiments.

The method according to the invention is characterized in that in the installation phase the hoisting ropes are lifted into the elevator shaft by means of an auxiliary hoist by moving the elevator car situated in the shaft with the auxiliary hoist fixed in connection with the elevator car, in connection with which elevator car the ends of the hoisting ropes are fixed.

The method according to one preferred embodiment of the invention is characterized in that at the start of the installation phase the elevator car is locked in the lower part of the elevator shaft and the free ends of the hoisting ropes are led from the rope reels disposed on the bottommost floor via at least the rope compensation appliance and the diverting pulleys below the elevator car back to the elevator car, to which the ends of the ropes are fastened, after which the elevator car is lifted to the upper part of the shaft by means of the auxiliary hoist while at the same time pulling the hoisting ropes along with the elevator car to the upper part of the elevator shaft where the ends of the hoisting ropes are led back to the elevator car, via at least the traction sheave and the diverting pulleys above the elevator, to which the ends of the ropes are fastened, and after which the elevator car is lowered to the lower part of the shaft by means of the auxiliary hoist while at the same time pulling the hoisting ropes along with the elevator car to the lower part of the shaft, where the hoisting ropes are cut to their right lengths and the ends of the hoisting ropes are fixed to their final fixing points.

The method according to another preferred embodiment of the invention is characterized in that at the start of the installation phase the elevator car is locked to the guide rails of the elevator e.g. by means of the safety gear essentially between the bottommost floor and the next to bottommost floor at such a point that gives access to the elevator shaft from the bottommost floor, and that provides access without scaffolding to the diverting pulley below the elevator car that moves along with the elevator car.

The method according to a third preferred embodiment of the invention is characterized in that when the elevator car is in the lower part of the elevator shaft the ends of the hoisting ropes are lifted by means of an auxiliary hoist to above the elevator car at least so high that when the elevator car is in the top position in a later phase of the installation, the ropes can pass around the traction sheave to the extent desired and under the diverting pulley that is above the elevator car and that moves along with the elevator car back to the diverting pulleys at the top and once again back downwards for a sufficient distance with respect to continued installation, and in that after lifting the ends of the hoisting ropes the hoisting ropes are fixed to the first fixing point on the elevator car from their point at the height of the elevator car and the free ends thus formed are lowered by means of the auxiliary hoist to the roof of the elevator car.

The method according to yet another preferred embodiment of the invention is characterized in that the elevator car is lifted to the fixing point of the hoisting ropes by means of an auxiliary hoist after fixing to the upper part of the elevator shaft, where the free ends of the hoisting ropes pass at least via the traction sheave and the diverting pulley functioning as the kicking roller of the hoisting machine back to the elevator car, where the free ends of the hoisting ropes pass below the diverting pulley, which is above the elevator car and which moves along with the elevator car, back to the diverting pulleys at the top then pass around the top of the diverting pulleys back down again to the elevator car, where the free ends of the hoisting ropes are fixed to their second fixing point such that the free ends of the ropes that go past the fixing point extend below the elevator car a suitable distance past the fixing point and the elevator car.

One advantage of the method according to the invention, among others, is that the installation work is safe, the ergonomics is good and there is no heavy physical work in any work phase. In this case also long ropes are easy and safe to install. Another advantage is that installation of the hoisting ropes is quick to perform and the need for separate tools is small.

Figure 2:
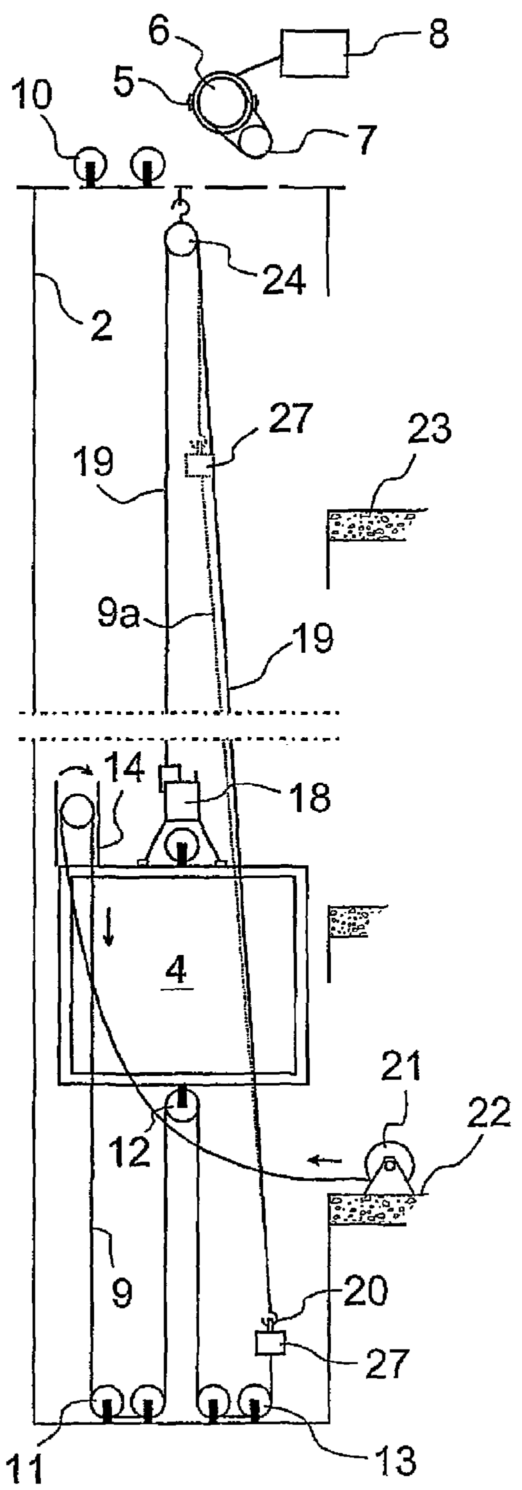
Figure 3:
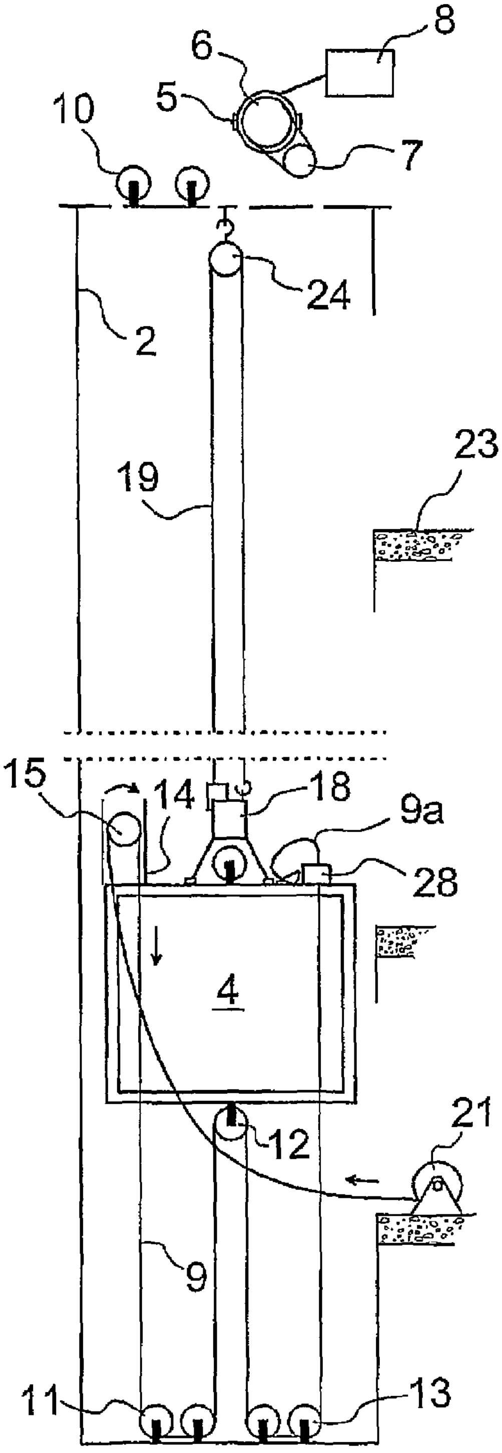
Figure 4:
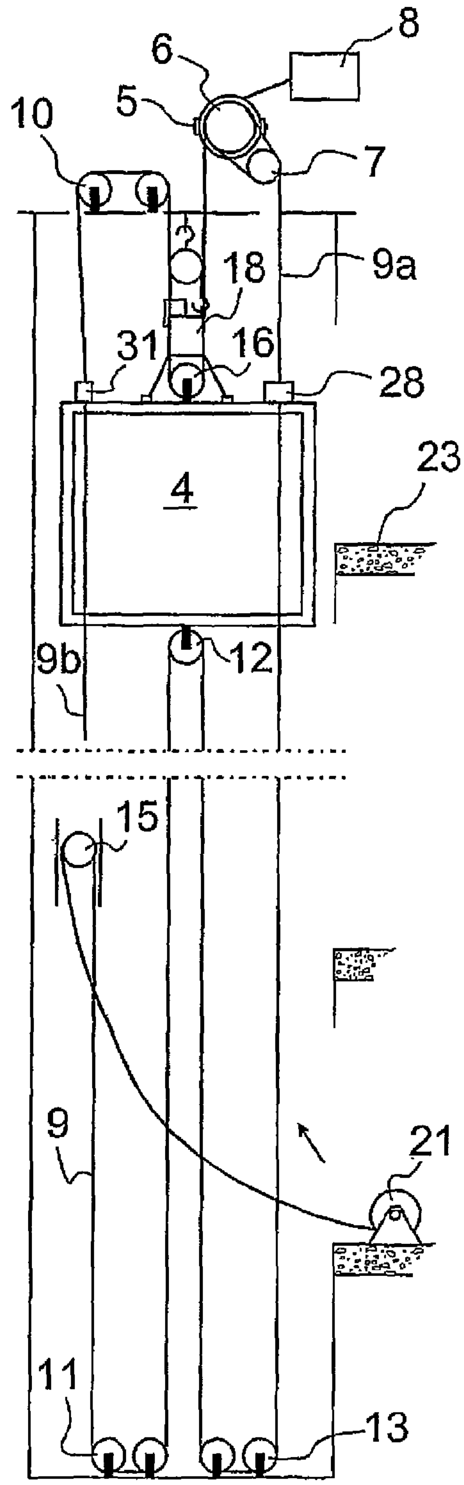
Figure 5:
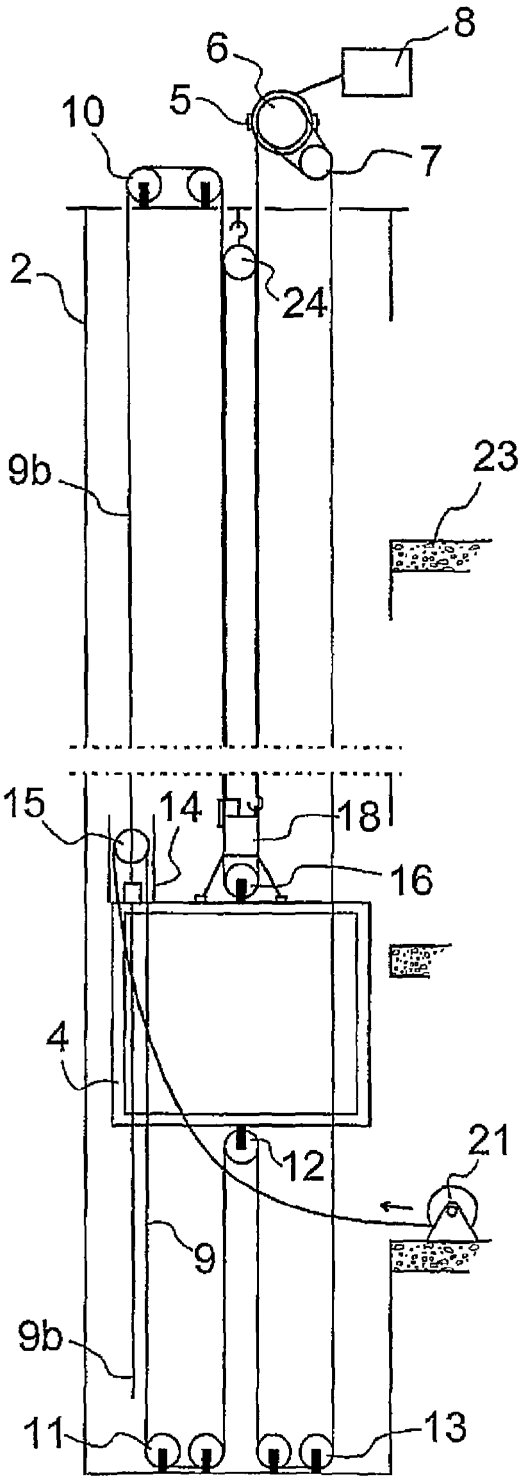
Figure 6:
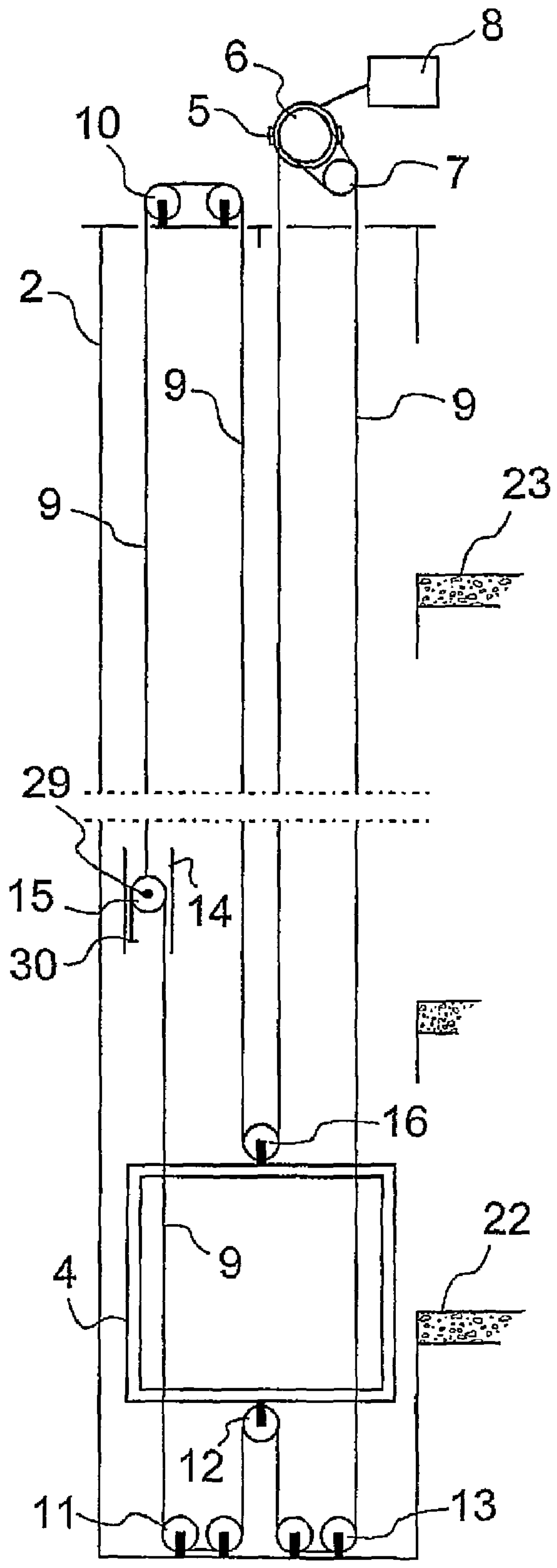

In the following, the invention will be described in more detail by the aid of one of its embodiments with reference to the attached drawings, wherein FIG. 1 presents a simplified side view of a traction sheave elevator without counterweight, in which the method according to the invention can be used and in which installation of the ropes is in its starting phase, FIG. 2 presents a side view of the phase following FIG. 1, FIG. 3 presents a side view of the phase following FIG. 2, FIG. 4 presents a side view of the phase following FIG. 3, in which the elevator car is lifted to the upper part of the shaft, FIG. 5 presents a side view of the phase following FIG. 4, in which the elevator car is lowered back to the lower part of the shaft and FIG. 6 presents a side view of an elevator with the roping finished.

FIG. 1 presents a traction sheave elevator without counterweight, in which installation of the hoisting ropes with the method according to the invention is in its starting phase. The guide rails 1, along which the elevator car 4 is fitted to travel backwards and forwards in essentially a vertical direction, are already installed in the elevator shaft 2. In addition a plurality of diverting pulleys 11, 13 is fixed to the bottom of the elevator shaft 2 ready in their correct positions in the lateral direction. Correspondingly a hoisting machine 5 equipped with a traction sheave 6 and a diverting pulley 7 functioning as a kicking roller situated in the proximity of the traction sheave are disposed in the machine room or in a suitable place in the upper part of the elevator shaft 2. The hoisting machine 5 is additionally connected to at least a control system 8, for supervising, controlling and operating the functions of the elevator. In addition a plurality of diverting pulleys 10 are situated in the machine room or in a suitable place on the upper part of the elevator shaft 2.

The elevator car 4 provided with a rope compensator 14 fixed according to the method to the wall of the shaft 2 or to the guide rails 1 of the elevator is situated in the starting phase of the installation in the lower part of the elevator shaft 2 and locked into position on the guide rail 1 by means of the gripping wedges of the safety gear 3. The locking is also ensured by means of safety chains 17. In addition an auxiliary hoist 18 is used, e.g. a so-called Tirak hoist, which is fastened to a suitable point on the car sling and the hoisting rope 19 of which is led to run over the diverting pulley 24 fastened with a hook 25 to the fixing point 26 in the upper part of the elevator shaft and back to the auxiliary hoist 18, to which the lifting hook 20 at the end of the hoisting rope 19 of the auxiliary hoist is fixed. The elevator car 4 is positioned in the vertical direction in such a location so that access to the elevator shaft from the bottommost floor 22 is easy, and so that the floor of the elevator car 4 is approx. mid-way between the bottommost floor and the next to bottommost floor, however so high that the diverting pulley 12 below the elevator car can be accessed without scaffolding.

The reels 21 of the hoisting ropes 9 are disposed on the bottommost floor 22 such that all the necessary ropes can be discharged from the reels simultaneously. For the sake of clarity the figures present only one reel 21. The hoisting ropes 9 are drawn from the reels 21 at first to the diverting pulley 15 of the compensation appliance 14, over which the ropes pass and are then led down towards the bottom of the elevator shaft.

For the sake of clarity the figures present only one reel 21 and also for the sake of clarity the guide rails 1, the safety gear 3 and the safety chains 17 are not presented in any other figures except FIG. 1.

FIG. 2 presents the phases following FIG. 1. The hoisting ropes are next led to the diverting pulley 12, which is situated below the elevator car 4 and which moves along with the elevator car, via the bottom of the first diverting pulleys 11 situated at the bottom of the elevator shaft, after passing over which the hoisting ropes 9 are again led downwards via the bottom of the second diverting pulleys 13 at the bottom of the elevator shaft and lifted upwards and then all fixed to the same rope fixing 27 in the lower part of the shaft. After this the hook 20 of the auxiliary hoist 18 is fastened to the rope fixing 27 and the ends of the ropes are lifted with the auxiliary hoist 18 sufficiently high upwards so that adequate free rope 9*a* is obtained. In FIG. 2 the raised rope anchor 27 and the free ends 9*a* of the rope are drawn with dot-and-dash lines. The length of the free ropes 9*a* needed depends on the height of the top clearance, but it must be at least so long that when the elevator car 4 is in the upper position in a later installation phase the ropes can pass to the extent required around the traction sheave 6 and back to the diverting pulleys 10 at the top via the diverting pulley 16, which is above the elevator car and moves along with it, and back downwards again a sufficient distance with respect to continued installation.

FIG. 3 presents the subsequent phases of the method, in which the hoisting ropes 9 are at first locked to the first fixing point 28 on the top part of the elevator car, after which the free ends 9*a* of the rope are lowered by means of the auxiliary hoist 18 to the roof of the elevator car 4. After this the hook 20 of the auxiliary hoist is fastened again to the auxiliary hoist 18 in order to lift the elevator car 4 to the upper position. Before the lifting the elevator car 4 is detached from the safety gear 3, after which the elevator car 4 is lifted by means of the auxiliary hoist 18 to the upper part of the elevator shaft 2.

FIG. 4 presents a situation in which the elevator car 4 has been lifted to the upper part of the elevator shaft 2. According to the method the elevator car 4 is driven by means of the auxiliary hoist 18 to the topmost floor 23 so high that access to the roof of the elevator car to continue the installation is possible from the topmost floor. When lifting the elevator car 4 the hoisting ropes 9 are at the same time drawn from the reels 21 upwards in the shaft by means of the car. As they are lifted the hoisting ropes 9 travel via the bottom of the diverting pulleys 11-13 below the elevator car, so that the ropes are lifted into the shaft at the same time approx. four times the comparative height of the shaft.

When the elevator car 4 is at the top, the free hoisting ropes 9*a* above the fixing point 28 are pulled one at a time over the hoisting machine 5 and the hoisting ropes 9*a* are passed first over the traction sheave 6 to the diverting pulley 7 which functions as a kicking roller and then back under the diverting pulley 7 to the traction sheave 6, from where the surplus ropes 9*a* are run to the roof of the elevator car 4. The ropes are now passed below the diverting pulley 16 on the roof of the car and lifted again to the machine room and passed above the diverting pulleys 10 again back to the roof of the elevator car 4, where the hoisting ropes 9*a* are fastened to the second fixing point 31 on the top part of the elevator car such that the free ends 9*b* of the ropes after the fixing point 31 extend a suitable distance past the fixing point 31 and the elevator car to below the car. A suitable distance is e.g. one meter. If the rope length in this phase is insufficient, more rope can be driven by means of the hoisting machine 5 of the elevator. Since the hoisting ropes pass via the traction sheave 6 and the diverting pulley 7, the traction sheave now has such good friction grip that driving more length of the ropes succeeds well.

After this the brake of the hoisting machine 5 is connected open electrically and the elevator car 4 is lowered with the auxiliary hoist 18 down again to essentially the same place mid-way between the first and the second floor where the elevator car was in the starting phase of the installation. The situation according to FIG. 5 presents this situation. As the elevator car 4 descends the traction sheave 6 rotates and at the same time more hoisting rope is pulled off the reels 21 until the elevator car 4 is stopped at a position where the floor of the car is approx. one meter above the bottommost floor 22.

FIG. 6 presents the subsequent phase, in which the hoisting ropes 9 are dimensioned so that the ends of the hoisting ropes can be fixed to the compensation appliance 14. The hoisting ropes 9 are cut to the right lengths and the first end 29 of the hoisting ropes is fixed to the diverting pulley 15 in the compensation appliance 14. Correspondingly the second end 30 of the hoisting ropes, which in the starting phase of the installation is passed over the diverting pulley 15 of the compensation appliance, is fastened to a fixed point in the compensation appliance essentially below the diverting pulley 15. After this the rope reels 21 are removed from the bottommost floor 22, and also the auxiliary hoist 18 and the safety chains 17, and the elevator car is detached from the safety gear 3, in which case the elevator car hangs freely supported by the hoisting ropes 9. Finally the equalization runs are driven, after which the elevator is again ready to be placed into service.

The compensating appliance 14 is disposed in the elevator shaft or other place suitable for the purpose that is not connected to the elevator car. It compensates the rope elongation with a moving diverting pulley 15 and divides the rope tensions so that by using a rope force compensating appliance 14 the tension of the rope portion below the elevator car can be maintained at a lower level than the tension in the rope portion above the elevator car. Diverting pulley 15 is arranged to be capable of moving a limited distance.

It is obvious to the person skilled in the art that the invention is not limited to the embodiments described above, in which the invention is described using examples, but that many adaptations and different embodiments of the invention are possible within the scope of the inventive concept defined by the claims presented below. Thus for example the elevator car can be locked into position during the replacement of the hoisting roping in some other way than by lowering it to rest on the safety gear. In this case the locking can also be by means of e.g. a guide rail brake or an arresting stop.

It is further obvious to the person skilled in the art that the elevator car suspension presented can be different to what is described above. The positioning and number of the diverting pulleys can vary and the compensation appliance can also be different, in which case certain details of the rope replacement are different than those explained in the examples above.

It is also obvious to the person skilled in the art that the sequence of the different phases of the method can differ to that presented.

The invention claimed is:

1. A method for installing hoisting roping in an elevator, comprising:

placing an elevator car in an elevator shaft with a bottom of the elevator car located above a floor of a building;

extending a hoisting rope around a first pulley, through at least one second pulley located at a bottom of the elevator shaft, around a third pulley on the bottom of the elevator car, around at least one fourth pulley located at a bottom of the elevator shaft;

attaching the hoisting rope to the elevator car at a first anchor point;

raising the elevator car upwardly in the elevator shaft;

extending the hoisting rope around a fifth pulley of a hoisting machine at a top of the elevator shaft and around a sixth pulley on top of the elevator car, and around at least one seventh pulley at the top of the elevator shaft;

attaching the hoisting rope to the elevator car at a second anchor point;

releasing the hoisting rope from the first anchor point;

lowering the elevator car in the elevator shaft;

releasing the hoisting rope from the second anchor point; and attaching the hoisting rope to the first pulley.

2. The method of claim 1, wherein the first pulley is a compensation appliance.

3. The method of claim 1, wherein the floor is a bottommost floor.

4. The method of claim 3, further comprising:

supplying the hoisting rope from a reel on the bottommost floor.

5. The method of claim 1, wherein the elevator car is raised and lowered by an auxiliary hoist.

6. The method of claim 5, wherein the auxiliary hoist is on top of the elevator car.

7. The method of claim 5, further comprising:

raising the hoisting rope from the fourth pulley to the first anchor point by the auxiliary pulley.

8. The method of claim 1, further comprising:

supplying the hoisting rope from a reel.

9. The method of claim 1, wherein the hoisting machine includes a traction sheave.

10. The method of claim 1, further comprising:

locking the elevator car to a guide rail with a safety gear when the elevator car is not moving.

* * * * *